United States Patent

[11] 3,634,027

| [72] | Inventors | Robert J. Champetier<br>Gardena;<br>Hung-Kuen A. Kan, Palos Verdes, both of Calif. |
|---|---|---|
| [21] | Appl. No. | 102,538 |
| [22] | Filed | Dec. 29, 1970 |
| [45] | Patented | Jan. 11, 1972 |
| [73] | Assignee | The United States of America as represented by the Secretary of the Air Force |

[54] METHOD OF PREPARING HIGH-PURITY ZIRCONIUM OXIDE
9 Claims, No Drawings

[52] U.S. Cl. .................................................. 23/20,
23/23, 23/24 Z, 23/140, 252/301.4, 23/85
[51] Int. Cl. .................................................. C22b 59/00
[50] Field of Search ........................................ 23/20, 23,
24 Z, 140, 85

[56] References Cited
UNITED STATES PATENTS

| 2,384,428 | 9/1945 | Cext .................... | 23/24 Z |
| 2,980,507 | 4/1961 | Rossmy ................ | 23/140 |
| 3,110,681 | 11/1963 | Meadows ............. | 23/140 X |
| 3,032,388 | 5/1962 | McCord et al. ...... | 23/23 |
| 3,366,443 | 1/1968 | Lauder et al. ........ | 23/140 X |

*Primary Examiner*—Herbert T. Carter
*Attorneys*—Harry A. Herbert, Jr. and Cedric H. Kuhn

ABSTRACT: A high-purity zirconium oxide white pigment is prepared by (1) precipitating zirconium oxychloride from a solution thereof in hydrochloric acid, (2) separating and washing the precipitated zirconium oxychloride, (3) heating the washed zirconium oxychloride in an atmosphere of carbon tetrachloride to a temperature sufficient to remove occluded liquids, (4) continuing to heat the zirconium oxychloride to a temperature at which it vaporizes, (5) contacting the vapors with a cool surface, thereby causing the vapors to condense, (6) recovering the sublimate from the cool surface, and (7) slowly heating the sublimate to an elevated temperature in an oxygen-containing atmosphere, thereby providing a fine powder of monoclinic zirconium oxide. The zirconium oxide product is useful as a pigment, particularly in solar reflector coating formulations.

METHOD OF PREPARING HIGH-PURITY ZIRCONIUM OXIDE

FIELD OF THE INVENTION

This invention relates to a method of preparing a high purity zirconium oxide pigment. In one aspect it relates to a zirconium oxide pigment that is particularly suitable for use in solar reflector coating formulations.

BACKGROUND OF THE INVENTION

Successful thermal control over large or curved surface areas of spacecraft depends in part upon the optical properties of the surface coatings and the behavior of these properties in the space environment. The thermophysical properties that are of particular interest to thermal designers are (1) solar absorptance ($\alpha_s$), the fraction of incident solar energy which a surface absorbs, and (2) the infrared emittance ($\epsilon_{IR}$), the fraction of heat that a surface radiates compared to that which a blackbody would radiate at the same temperature.

Pigmented white coatings have been used in the past for thermal control over spacecraft surfaces. In the space environment, materials are subjected to solar ultraviolet (UV) rays and particulate radiations that can change their optical properties. The stability of coatings with low ratios of solar absorptance to thermal emittance ($\alpha_s/\epsilon_{IR}$) under various radiation environments has been the subject of a large amount of research and development work. At the present time, UV-stable coatings with $\alpha_s/\epsilon_{IR}=0.18/0.9$ can be produced from ZnO in a potassium silicate binder. However, a particular need exists to provide coatings that are stable in both UV and proton environment and have a lower $\alpha_s/\epsilon_{IR}$ ratio.

It is an object of this invention, therefore, to provide a high purity zirconium oxide that is particularly useful as a pigment in solar reflector coating formulations.

Another object of the invention is to provide a method for preparing a high purity zirconium oxide.

A further object of the invention is to provide a zirconium oxide pigmented coating which has a low $\alpha_s/\epsilon_{IR}$ ratio.

Other objects and advantages of the invention will become apparent to those skilled in the art upon consideration of the accompanying disclosure.

SUMMARY OF THE INVENTION

The present invention resides in a method for preparing a high purity zirconium oxide pigment. Broadly speaking, the method comprises the steps of (1) precipitating zirconium oxychloride from a solution thereof in hydrochloric acid, (2) separating and washing the precipitated zirconium oxychloride, (3) heating the washed zirconium oxychloride in an atmosphere of carbon tetrachloride to a temperature sufficient to remove occluded liquids, (4) continuing to heat the zirconium oxychloride to a temperature at which it vaporizes, (5) contacting the vapors with a cool surface, thereby causing the vapors to condense, (6) recovering the sublimate from the cool surface, and (7) slowly heating the sublimate to an elevated temperature in an oxygen-containing atmosphere. The product obtained is monoclinic zirconium oxide in the form of a fine powder.

In carrying out the method of this invention, initially a solution of zirconium oxychloride ($ZrOCl_2$) in hydrochloric acid (HCl) is prepared. The $ZrOCl_2$ may be conveniently added to the HCl as a solution in water. At room temperature $ZrOCl_2$ dissolves in HCl at the rate of only 0.05 mole per liter while at elevated temperatures, e.g., at 85 to 95° C., the oxychloride can be dissolved in HCl to near saturation. Because the solubility of $ZrOCl_2$ in HCl is thus highly temperature dependent, the initial purification of the compound can be readily accomplished by crystallization. Accordingly, after addition of the $ZrOCl_2$ to the HCl, the mixture is heated under atmospheric pressure to a temperature in the range of about 85° to 95° C. Heating is continued while stirring for a period of time sufficient to cause dissolution of the oxychloride.

After the solution is formed, it is then cooled to about room temperature, e.g., to about 20° to 25° C. It is to be understood that the solution can be cooled to lower temperatures, but for economic and practical reasons, it is preferred to cool to about room temperature. Or to state the proposition in another manner, the solution is cooled to a temperature at which substantially all of the $ZrOCl_2$ precipitates from solution. It is generally preferred to accomplish the cooling as rapidly as possible since it has been found that long cooling periods, e.g., over a period of 24 hours, produce large needlelike crystals containing observable liquid inclusions. Thus, the solution is preferably cooled to room temperature in a short period, e.g., from about 15 to 60 seconds. This can be accomplished by any suitable means as by immersing the vessel containing the solution in an ice bath while continuously stirring the solution. However, longer cooling periods, e.g., up to 3 hours can be employed with satisfactory results.

The cooling of the solution results in the precipitation or crystallization of the $ZrOCl_2$, generally as fine white particles. The oxychloride is then separated from the HCl by any suitable means, such as by filtration or decantation. The separated oxychloride is washed with a suitable wash media such as HCl and acetone and drained thoroughly by vacuum filtration. In a preferred procedure, the oxychloride is washed first with HCl and then with acetone. Also, the removal of liquid inclusions can be facilitated by crushing the oxychloride, particularly if they are in the form of large crystals. It is often desirable to wash and drain the oxychloride several times in order to ensure a maximum removal of impurities. Also, the washing procedure can be rendered more efficient by ultrasonic mixing of the oxychloride and wash media.

In another embodiment of the invention, the hot concentrated solution is mixed with or poured into cooled acetone. The $ZrOCl_2$ precipitates from the solution in the form of small ($<1$ $\mu$m) crystals. The crystals so formed are then separated, washed and drained as described in the preceding paragraph.

In a preferred procedure, the above-described steps of the method are repeated at least one more time. Thus, the $ZrOCl_2$ recovered from the washing step is redissolved in HCl, precipitated from the resulting solution, separated from the HCl, and then washed and drained.

The $ZrOCl_2$ recovered from the wash step is then slowly heated to a temperature in the range of about 220° to 230° C. in an atmosphere of carbon tetrachloride. The heating is conveniently conducted in a fused silica glassware furnace. An inert gas, such as nitrogen, is conveniently used as a carrier gas for introducing carbon tetrachloride vapor into the furnace. Low flow rates of from 10 to 20 cm.³ per minute and preheating of the gas as it enters the furnace assure conditions such that the $ZrOCl_2$ is not cooled significantly by gas flow. Heating of the material at 220° to 230° C. is continued until all liquids are released and removed from the furnace. A heating period of about 1 to 5 hours has been found to be sufficient to dry the $ZrOCl_2$.

After the drying step, the temperature of the furnace is increased sufficiently to cause the $ZrOCl_2$ to vaporize. This temperature generally falls in the range of about 280° to 310° C. The resulting vapors leave the furnace and condense on a cool glassware surface outside of the furnace. Heating of the $ZrOCl_2$ is continued until only a small amount of residue remains, which depending upon the amount of the oxychloride to be vaporized may require several hours.

The sublimate is recovered from the cool glass surface by any suitable means, as by scraping, and then calcined. The calcination is carried out by heating the sublimate in air at a temperature in the range of about 1,100° to 1,150° C., preferably from 1,120° to 1,140° C., for a period of from 10 to 20 minutes, preferably about 15 minutes. The product obtained is a high purity, fine powder of monochlinic zirconium oxide.

The $ZrO_2$ prepared by the method of this invention can be used directly as a pigment. While it is particular suitable for use in coating formulations for spacecraft, the pigment can also be advantageously employed for certain earthbound applications which require low solar absorptance coatings on mechanical structures, such as telescopes and antenna systems, where critical dimensional stability is adversely affected by variations in the absorbed solar flux. The pigment has a low level of fluorescence which, along with its other properties, is needed in optical instrumentation, such as reflectance standards for arc image furnaces. Furthermore, the zirconium oxide can be readily doped during its preparation to provide a material with controlled fluorescence and phosphorescence properties for use on cathode ray tubes and other electronic and optical devices.

A more complete understanding of the invention can be obtained by referring to the following examples which are not intended, however, to be unduly limitative of the invention.

EXAMPLE I

A commercially available high purity zirconium oxychloride ($ZrOCl_2$) solution in water is added to HCl and heated to 90° C. Upon cooling to room temperature, $ZrOCl_2$ precipitates from the solution. The precipitated $ZrOCl_2$ is recovered by vacuum filtration and then washed first with HCl and then with acetone. The washing procedure is repeated two more times, and after each washing the precipitate is drained by vacuum filtration.

Thereafter the $ZrOCl_2$ precipitate is redissolved in HCl and heated to 90° C. The solution is then cooled and the $ZrOCl_2$ precipitate obtained is recovered and washed in the manner described in the preceding paragraph.

After the final washing, the $ZrOCl_2$ is slowly heated to 225° C. in an atmosphere of carbon tetrachloride. The heating is carried out in a fused silica glassware furnace, and dry nitrogen is used as the carrier gas for the carbon tetrachloride vapor. The gas is introduced at a low flow rate of about 15 cm.$^3$ per minute and is preheated prior to entry into the furnace in order to prevent any significant cooling of the $ZrOCl_2$ as a result of gas flow. Heating at 225° C. is continued until all occluded liquids are released and removed. The temperature is then increased to about 300° C. at which temperature the oxychloride vaporizes. The vapors condense on a cool glass surface which is outside of the furnace. Heating is continued until the desired amount of the oxychloride sublimes on the cool glass surface.

The sublimate is recovered from the cool glass surface and is then calcined. The calcination is conducted by heating the sublimate in air at about 1,120° C. for 15 minutes after which the product is cooled in air to room temperature. The heating of the sublimate is carried out in a high purity, recrystallized alumina boat placed inside a tube of the same material. The product obtained is a high purity monoclinic zirconium oxide in the form of a fine powder. The improvement in purity obtained is attributable at least in part to the sublimation step which is believed to result in conversion of alkali and divalent impurities to chlorides of low vapor pressure so that they are retained in the residue.

EXAMPLE II

A coating is prepared using a sample of $ZrO_2$, prepared as described in example I, as the pigment and potassium silicate as the binder. The $ZrO_2$ constitutes about 16 weight percent of the coating composition. Based on reflectance measurements from 2900 A. to 24,000 A., the coating shows an initial solar absorptance, $\alpha_s$, less than 0.11. The coating has a high infrared emittance of about 0.9. Thus, the $\alpha_s/\epsilon IR$ ratio of the coating equals about 0.11/0.9. After 3 months of exposure to simulated solar UV irradiation, $\alpha_s$ increases by about 0.06. The $\alpha_s$ increases about 0.02, after exposure of the coating to $10^{16}$ protons/cm.$^2$ at 3 KeV. These data indicate that the coating has good proton stability.

As will be evident to those skilled in the art, various modifications of the invention can be made or followed in the light of the foregoing disclosure without departing from the spirit or scope of the invention.

We claim:

1. A method for preparing a high purity zirconium oxide pigment which comprises the steps of precipitating zirconium oxychloride from a solution thereof in hydrochloric acid; separating said precipitated zirconium oxychloride from said hydrochloric acid; washing said separated zirconium oxychloride; heating said washed zirconium oxychloride in an atmosphere of carbon tetrachloride to a temperature sufficient to remove occluded liquids; continuing to heat said zirconium oxychloride to a temperature at which it vaporizes; contacting the resulting vapors with a cool surface, thereby causing said vapors to condense; removing the resulting sublimate from said cool surface; and heating said sublimate to an elevated temperature in an oxygen-containing atmosphere.

2. The method according to claim 1 in which said solution is prepared by adding zirconium oxychloride to hydrochloric acid and heating the resulting mixture to a temperature in the range of about 85° to 95° C. and in which said zirconium oxychloride is precipitated by cooling said solution to room temperature.

3. The method according to claim 2 in which said solution is cooled to room temperature within a period of from about 15 to 60 seconds.

4. The method according to claim 1 in which said solution is prepared by adding zirconium oxychloride to hydrochloric acid and heating the resulting mixture to a temperature in the range of about 85° to 95° C. and in which said zirconium oxychloride is precipitated by mixing said solution with cooled acetone.

5. The method according to claim 1 in which said washed zirconium oxychloride is redissolved in hycrochloric acid, precipitated from the resulting solution and then washed.

6. The method according to claim 1 in which said separated zirconium oxychloride is washed first with hydrochloric acid and then with acetone, the latter materials being drained from said zirconium oxychloride after each washing and in which each washing and draining is carried out consecutively at least two times.

7. The method according to claim 1 in which said washed zirconium oxychloride is heated to a temperature in the range of about 220° to 230° C., and after removal of occluded liquids continuing to heat said zirconium oxychloride at a temperature in the range of 280° to 310° C.

8. The method according to claim 1 in which said sublimate is heated in air at a temperature in the range of 1,100° to 1,150° C. for a period of from 10 to 20 minutes.

9. The method according to claim 1 in which said sublimate is heated in air at a temperature in the range of 1,120° to 1,140° for a period of 15 minutes.

* * * * *